United States Patent [19]

Coward

[11] Patent Number: 5,315,288
[45] Date of Patent: May 24, 1994

[54] METHOD AND APPARATUS FOR CONTROLLING ELECTRIC CIRCUIT OUTPUT LEVEL IN BACKUP ALARMS LIGHTING FIXTURES, SENSORS AND THE LIKE

[75] Inventor: Mark T. Coward, Boise, Id.

[73] Assignee: Electronic Controls Company, Boise, Id.

[21] Appl. No.: 705,035

[22] Filed: May 24, 1991

[51] Int. Cl.$^5$ .............................................. B60Q 1/26
[52] U.S. Cl. ..................................... 340/463; 340/474; 340/692; 340/384.7; 381/57; 381/102; 381/104
[58] Field of Search ............... 340/474, 692, 384, 463; 381/57, 102, 104

[56] References Cited

U.S. PATENT DOCUMENTS

| | | | |
|---|---|---|---|
| 3,943,507 | 3/1976 | Neal et al. | 340/463 |
| 4,603,317 | 7/1986 | Gailbreath et al. | 340/463 |
| 4,785,285 | 11/1988 | Teich et al. | 340/505 |
| 4,881,058 | 11/1989 | Berry, III | 340/384 E |
| 4,929,924 | 5/1990 | Buyak et al. | 340/384 Z |

OTHER PUBLICATIONS

Wireless World (Jan. 1980) vol. 86 No. 1529.

*Primary Examiner*—Jin F. Ng
*Assistant Examiner*—Nina Tong
*Attorney, Agent, or Firm*—Davis & Schroeder

[57] ABSTRACT

Two volume levels may be produced in a backup alarm merely by reversing polarity of the DC power connections to the circuit of the present invention. The magnitude of output power produced by any device powered by a DC source may be switched between two levels merely by reversing polarity of the power source connected to the device when used with a circuit of the present invention.

8 Claims, 2 Drawing Sheets

METHOD AND APPARATUS FOR CONTROLLING ELECTRIC CIRCUIT OUTPUT LEVEL IN BACKUP ALARMS LIGHTING FIXTURES, SENSORS AND THE LIKE

TECHNICAL FIELD

This invention relates to the control of output power, intensity or sensitivity levels of electrically-operated devices. In particular, the invention relates to providing two different sound levels from an electrically-operated horn, alarm or other sound-emitting device by simply reversing the polarity of the power connections to the device. The present invention may be applied to lighting systems for controlling intensity of lamps, transducer systems for controlling sensitivity levels of sensors, or to any systems powered from a DC source for providing two logic or power output levels.

BACKGROUND ART

Alarm devices are required for many applications, including mobile construction, mining and industrial equipment. Such devices emit a sound in the audible range of human hearing to warn persons in the immediate area that an emergency or other unexpected event is taking place, or that a vehicle is backing up and that the operator of the vehicle may not see or be able to maneuver around those persons.

In the prior art of backup alarms, there is substantial technology for control of the volume of alarm sound emitted by such alarm devices. See, for example, U.S. Pat. Nos. 4,603,317 and 3,173,136. In addition, modern prior art electrically-operated backup alarms usually comply with criteria and standards promulgated by government agencies as well as self-regulating industrial organizations. See for example Section 1926.601 of the Department of Labor, Occupational Safety and Health Standards entitled "Motor Vehicles"; Department of Interior Mining Enforcement and Safety Administration Section 77.410; U.S. Army Corp of Engineers Manual Section EM385-1-1; and Society of Automotive Engineers (S.A.E.) Standard J994B.

Frequently, the sound level in typical prior art electrically-operated backup alarms is pre-set. The sound level in some alarms may be manually adjusted among more than one sound level using switches, shorting bars and the like. In still other types of backup alarms, the emitted sound level is automatically adjusted relative to sensed ambient noise levels. In such devices, the emitted sound level is automatically adjusted between pre-set maximum and minimum levels in accordance with recommended or required standards. The increase or decrease of emitted sound level between those limits is approximately linear and remains at a substantially constant level above the sensed ambient noise.

Most backup alarms are ruggedized, even hermetically sealed, to survive severe operating environments. Similarly, other alarm devices and other outdoor lighting and environmental sensor systems are also ruggedized and hermetically sealed.

In addition to concern for contributing to hearing impairment of persons working in or otherwise exposed to noise levels in excess of 62 db, operators of machinery simply tire of listening to loud alarm devices in their work place, especially when the machinery they are operating backup frequently. Since such alarm devices are important for safety and welfare of all personnel in the immediate areas of mobile construction equipment and industrial machinery, the risk of injury to such personnel and other persons in the area is increased if backup alarms are disabled or otherwise modified so they can not be heard above ambient noise levels. However, ambient noise levels vary and a simple, reliable and inexpensive method for setting the level of emitted sound from low-cost backup alarms is desirable.

In addition to simple, reliable and inexpensive adjustment between two levels of emitted sound levels from backup alarms for mobile construction, mining and industrial equipment, apparatus for simple, reliable and inexpensive adjustment of light intensity, sensor sensitivity or the volume or magnitude of the output of any other system powered from a DC source is desirable. Thus, a circuit for setting the output levels of a system having two pre-determined levels without a switch or other hardware, without separate power control, and, if sealed, without compromising the integrity of the seal is desirable.

DISCLOSURE OF INVENTION

A circuit for controlling the output level of an electrically powered system between two pre-selectable levels constructed according to the present invention, selects one of the two output levels merely by reversing the polarity of the power applied to the system. The circuit includes a polarity sensitive switch which controls power supplied to loads coupled to the output of the switch. Thus, for example, with power connected in one polarity, current flow through a resistor in parallel with the switch is limited to one value because the switch is open; with the polarity of the applied power reversed, the switch effectively forms a short circuit across the parallel resistor to provide increased current flow to the load. Hence, higher or lower volume, magnitude, sensitivity, or other similar parameter is set, depending on polarity of the applied power.

BRIEF DESCRIPTION OF THE DRAWINGS

For fuller understanding of the present invention, reference is made to the accompanying drawing in the following detailed Description of the Preferred Embodiment of the invention. In the drawing.

Figure 1:
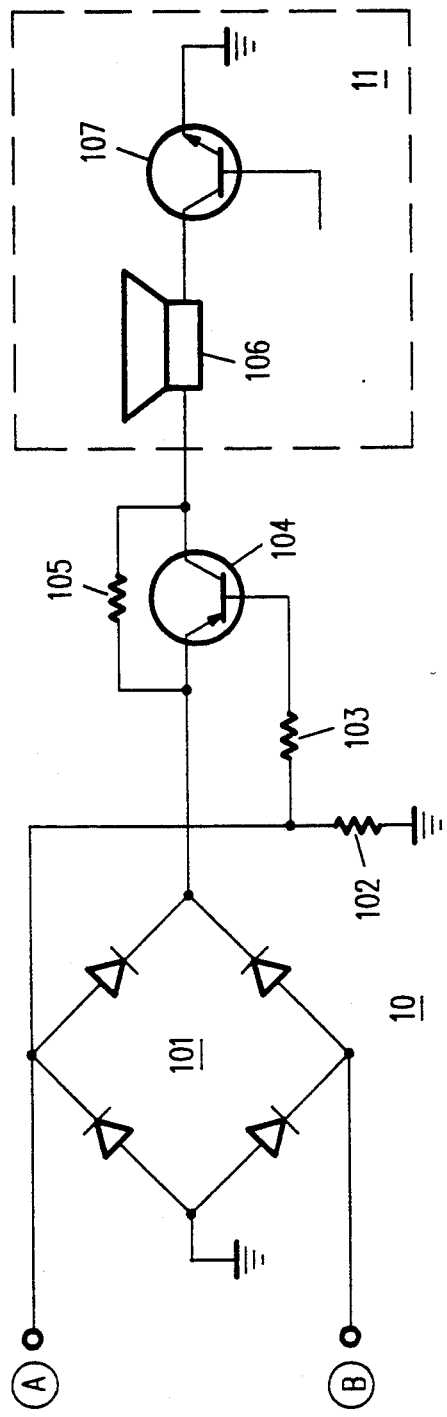
FIG. 1 is a schematic diagram for the output level control circuit constructed according to the principles of the present invention.

Reference numbers refer to the same or equivalent parts of the present invention throughout the several figures of the drawing.

BEST MODE OF CARRYING OUT THE INVENTION

Output level control circuit 10, comprising the preferred embodiment of the present invention, includes bridge coupler 101, resistors 102 and 103 transistor 104 and resistor 105. Speaker 106 and transistor 107 comprise electrical load 11 for output level controller circuit 10, and form no part of the present invention. For the embodiment of FIG. 1, load 11 includes components for producing sound in either a backup alarm or other sound-emitting device.

The diodes comprising bridge coupler 101 may be type 1N4006 manufactured by Motorola, Inc. Resistors 102 and 103 may be an ordinary carbon deposited resistors of value on the order of 10,000 ohms. Finally, transistor 104 may be PNP type TIP 127, also manufactured by Motorola, Inc.

With continuing reference to FIG. 1, transistor 104 operates as a switch. In operation, if the positive terminal of a DC power source such as a battery is connected to terminal A and the negative terminal of the power source is connected to terminal B of circuit 10, current flow to load 11 is limited by resistor 105 because transistor 104 is biased to cutoff by the voltage applied to the base of transistor 104. For load 11, the resulting low current flow produces low output volume of sound from speaker 106.

If the power connections are reversed such that the positive terminal of a DC power source is applied to terminal B of circuit 10 and the negative terminal of the power source is connected to terminal A, transistor 104 will be biased to saturation to effectively form a short circuit across resistor 105 and increase current flow to load 11. Increased current flow to load 11 produces higher volume output from speaker 106. The negative polarity terminal is connected to ground of circuit 10 via appropriate diode path provided by diode coupler 101 when connected to either terminal A or B of circuit 10.

Figure 2A:
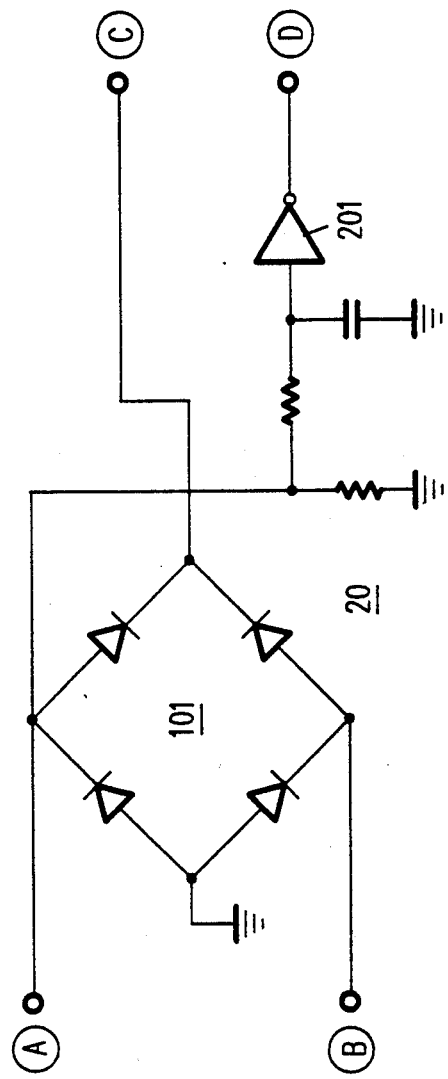
FIG. 2A is a schematic diagram of a second embodiment of the circuit of FIG. 1.
Figure 2B:
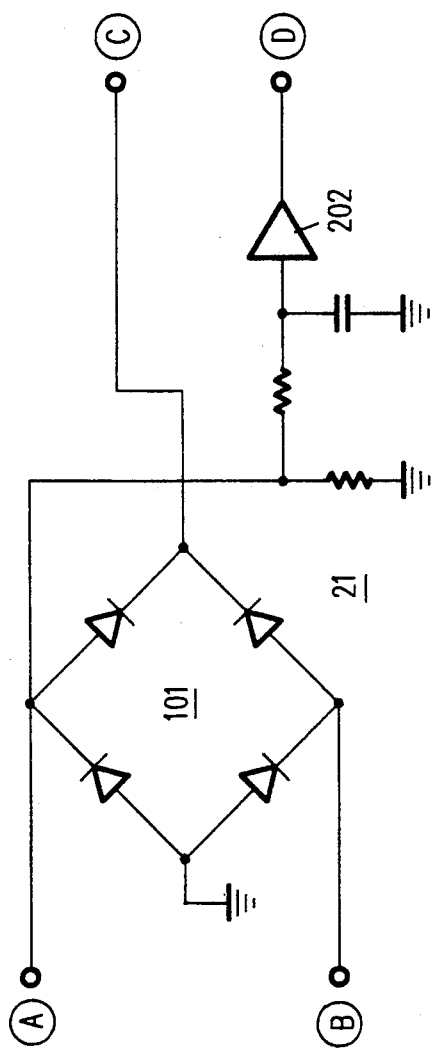
FIG. 2B is a schematic diagram of a third embodiment of the circuit of FIG. 1.

Referring now to FIGS. 2A and 2B, the actual voltages representing the logic levels at terminals C-D of logic gate circuits 20 and 21 is determined by the polarity and level of power supplied to the inverting amplifier 201 and amplifier 202, respectively. Thus, with positive power to the amplifiers, a logic level zero is provided at terminals C-D in the circuit of FIG. 2A when positive power is applied to terminal A and negative power is applied to terminal B. Conversely, a logic level one is provided at terminal C-D in the circuit of FIG. 2B when positive power is applied to terminal A and negative power is applied to terminal B. If the polarity of the power applied to terminals A and B of circuits 20 and 21 is reversed, then the logic levels at terminals C-D is also inverted. Thus, for logic gate circuit 20, a logic level one is produced with negative power applied to point A and positive power applied to terminal B and for logic gate circuit 21, a logic level zero is produced at terminals C-D when positive power is applied to terminal B and negative power applied to terminal A.

Figure 3:
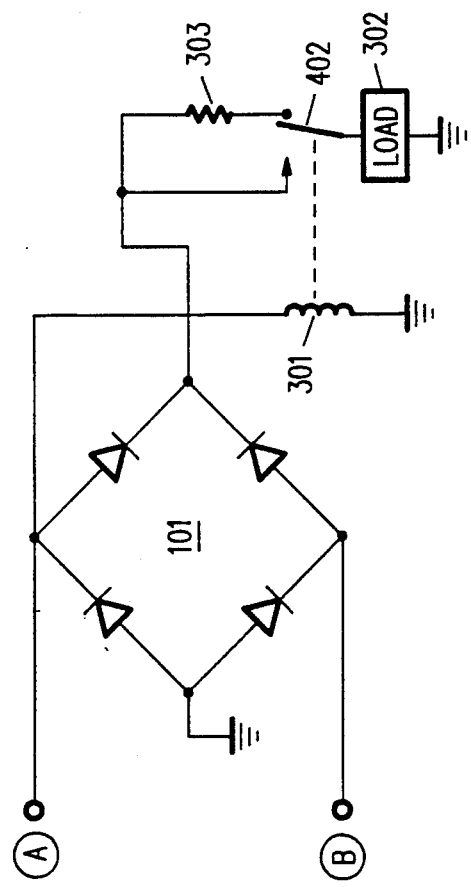
FIG. 3 is a schematic diagram of a fourth embodiment of the circuit of FIG. 1.

Referring now to FIG. 3, increased current is provided to load 302 when positive power is applied to terminal A and negative power applied to terminal B, because relay 301 is activated to bypass resistor 303. Conversely, if negative power is applied to terminal A and positive power applied to terminal B, relay 402 is de-energized and less current is provided to load 302 via resistor 303.

The present invention has been particularly shown and described with respect to certain preferred embodiments of features thereof. However, it should be readily apparent to those of ordinary skill in the art that various changes and modifications in form and details may be made without departing from the spirit and scope of the invention as set forth in the appended claims.

We claim:

1. Apparatus for setting the power output level delivered to a load connected to an electrical circuit, when the polarity of applied power is reversed, said apparatus comprising:

power receiving means for receiving said applied power in a first or second polarity;

conducting means, coupled to said power receiving means, for conducting power to the load connected thereto; and bias means, coupled to said power receiving means and to said conducting means, for setting the output power delivered to the load to a first power level when power is applied in said first polarity and for setting the power delivered to the load to a second power level when power is applied in said second polarity;

said first power level providing a first current flow to the load;

said second power level providing a second current flow to the load, said second current flow less than said first current flow;

wherein said apparatus provides said first power level and said second power level when the polarity of said applied power is reversed.

2. Apparatus as in claim 1 wherein said conducting means includes current limiting means for limiting power conducted to the load when said applied power is received in said first polarity.

3. Apparatus as in claim 2 wherein said current limiting means is shorted when said applied power is received in said second polarity.

4. Apparatus as in claim 3 wherein said current limiting means includes a transistor which is biased to cutoff when said applied power is received in said first polarity, and which is biased to saturation when said applied power is received in said second polarity.

5. Apparatus as in claim 4 wherein said current limiting means is a resistor coupled in parallel with said transistor.

6. Apparatus as in claim 5 wherein said power receiving means comprises a diode bridge.

7. Apparatus as in claim 6 wherein said load comprises a sound emitting device.

8. Apparatus as in claim 7 wherein said sound emitting device is a vehicle backup alarm.

* * * * *